US012585796B2

(12) United States Patent
Chinnu et al.

(10) Patent No.: US 12,585,796 B2
(45) Date of Patent: Mar. 24, 2026

(54) MANAGING DATA ACCESS VIA HYBRID CLOUD AND MULTI-CLOUD DATA STORES

(71) Applicant: Dell Products L.P., Round Rock, TX (US)

(72) Inventors: Govindasamy Chinnu, Bangalore (IN); Gokul Thiruchengode Vajravel, Bangalore (IN); Shailesh Hastimal Jain, Mahrashtra (IN)

(73) Assignee: Dell Products L.P., Round Rock, TX (US)

( * ) Notice: Subject to any disclaimer, the term of this patent is extended or adjusted under 35 U.S.C. 154(b) by 29 days.

(21) Appl. No.: 18/761,614

(22) Filed: Jul. 2, 2024

(65) Prior Publication Data

US 2026/0010639 A1     Jan. 8, 2026

(51) Int. Cl.
*G06F 21/60*          (2013.01)

(52) U.S. Cl.
CPC .................................. *G06F 21/602* (2013.01)

(58) Field of Classification Search
CPC ....................................................... G06F 21/602
See application file for complete search history.

(56) References Cited

U.S. PATENT DOCUMENTS

| | | | | |
|---|---|---|---|---|
| 8,874,915 B1 * | 10/2014 | Rodoper | ............... | H04L 9/0838 |
| | | | | 380/278 |
| 2013/0246588 A1 * | 9/2013 | Borowicz | ............... | G06F 16/27 |
| | | | | 709/220 |
| 2022/0382469 A1 * | 12/2022 | Rath | ................... | G06F 11/3466 |
| 2024/0403448 A1 * | 12/2024 | Chan | ..................... | G06F 21/602 |

* cited by examiner

*Primary Examiner* — Sangseok Park
(74) *Attorney, Agent, or Firm* — McDermott Will & Schulte LLP

(57) ABSTRACT

Managing data access, including receiving, at a front end presentation layer managed, a read/write request associated with data, the server information handling system in communication with the client information handling system; validating, at a business logic layer, the read/write request; identifying, by the business logic layer and from a database layer, a location of data associated with the read/write request that is stored at a data store, the location of the data store distinct from a location of the server information handling system; identifying, by the business logic layer and from the database layer, encryption keys associated with the data; requesting, by the business logic layer and from the data store, the data based on i) the location of the data store storing the data, and ii) the encryption keys associated with the data; providing, by the data store, a response to the read/write request, the response including the data.

12 Claims, 6 Drawing Sheets

600

Receive Read/
Write Request
_602_

Validate Request
_604_

Identify Location of
Data
_606_

Identify Encryption
Keys
_608_

Request Data
_610_

Provide Response
_612_

MANAGING DATA ACCESS VIA HYBRID CLOUD AND MULTI-CLOUD DATA STORES

BACKGROUND

Field of the Disclosure

The disclosure relates generally to managing data access via hybrid cloud and multi-cloud data stores.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Cloud storage is a mode of computer data storage where digital data is stored on servers in off-site locations. These servers are maintained by third-party providers who make such data accessible via public or private internet connections.

SUMMARY

Innovative aspects of the subject matter described in this specification may be embodied in a method of managing data access, including receiving, at a front end presentation layer managed by a server information handling system and from a client information handling system, a read/write request associated with data, the server information handling system in communication with the client information handling system; validating, at a business logic layer of the server information handling system, the read/write request; identifying, by the business logic layer and from a database layer of the server information handling system, a location of data associated with the read/write request that is stored at a data store, the location of the data store distinct from a location of the server information handling system; identifying, by the business logic layer and from the database layer, encryption keys associated with the data; requesting, by the business logic layer and from the data store, the data based on i) the location of the data store storing the data, and ii) the encryption keys associated with the data; and providing, by the data store and to the client information handling system, a response to the read/write request, the response including the data.

Other embodiments of these aspects include corresponding systems, apparatus, and computer programs, configured to perform the actions of the methods, encoded on computer storage devices.

These and other embodiments may each optionally include one or more of the following features. For instance, the location of the data store is a separate cloud data store distinct from a cloud infrastructure of the server information handling system. The location of the data store is included by a cloud infrastructure of the client information handling system. Receiving, at the front end presentation layer managed by the server information handling system and from an additional client information handling system, an additional read/write request associated with additional data, the server information handling system in communication with the additional client information handling system; validating, at the business logic layer management by the server information handling system, the additional read/write request; identifying, by the business logic layer and from the database layer of the server information handling system, a location of the additional data associated with the additional read/write request that is stored at an additional data store, the location of the additional data store distinct from the location of the server information handling system and distinct from the location of the data store; identifying, by the business logic layer and from the database layer, additional encryption keys associated with the additional data; requesting, by the business logic layer and from the additional data store, the additional data based on i) the location of the additional data store storing the additional data, and ii) the additional encryption keys associated with the additional data; and providing, by the additional data store and to the additional client information handling system, an additional response to the additional read/write request, the additional response including the additional data. Prior to receiving the read/write request: receiving, at the front end presentation layer of the server information handling system and from the client information handling system, a deployment request for the data; receiving, at the front end presentation layer of the server information handling system and from the client information handling system, input indicating the location of storage of the data and the encryption keys; updating, by the business logic layer of the server information handling system, a table at the database layer indicating i) the location of storage of the data and ii) the encryption keys; and storing, by the database layer of the server information handling system, the data at the data store that is indicated by the location of the user input.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
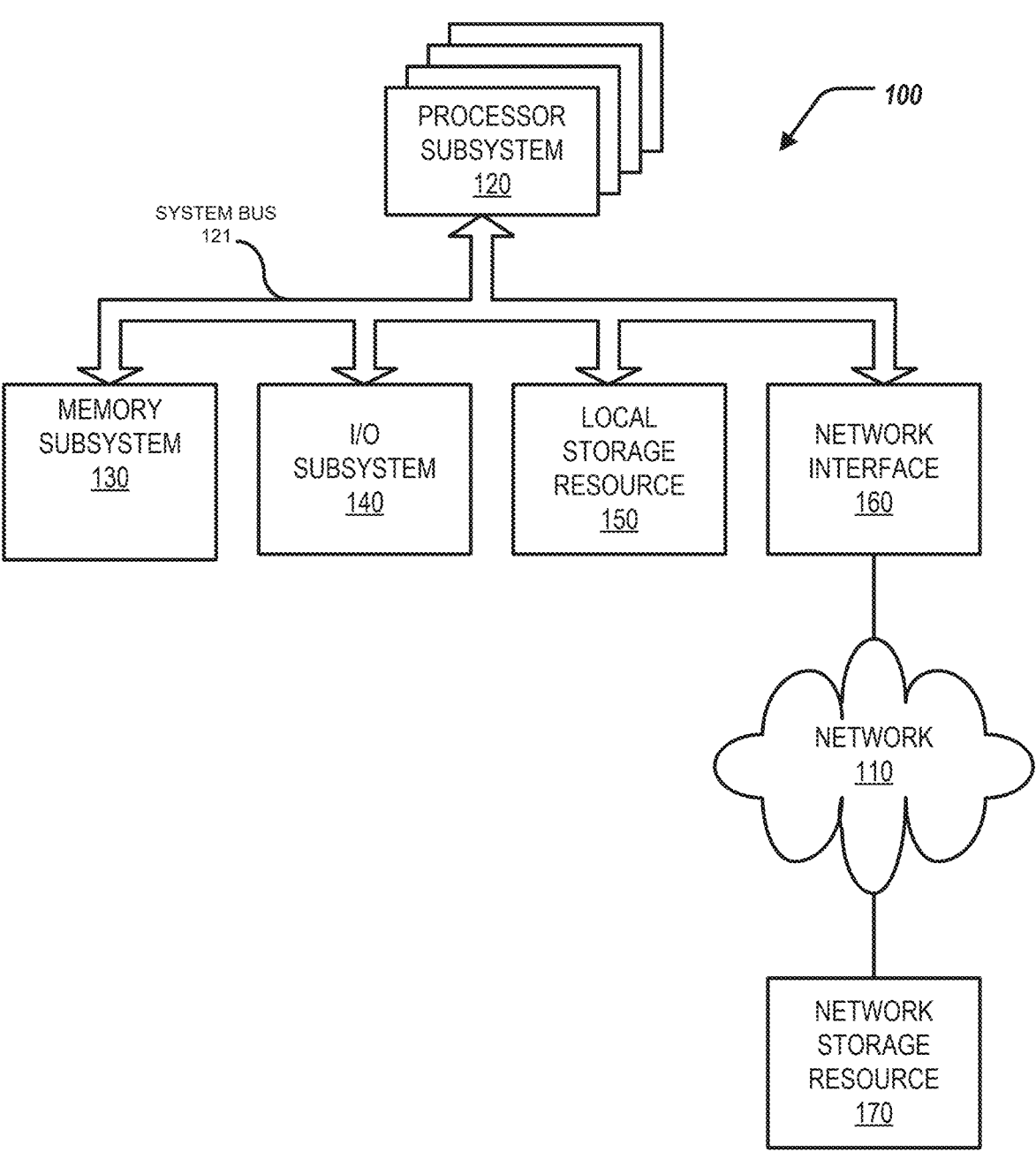
FIG. 1 is a block diagram of selected elements of an embodiment of an information handling system.

This disclosure discusses methods and systems for managing data access via hybrid cloud and multi-cloud data stores. In short, a hybrid cloud multi-tenant architecture endpoint management solution with database management on-premise and management servers in a hosted public cloud is provided. Further, a multi-cloud multi-tenant architecture endpoint management solution with database management on-premise and management servers in a hosted public cloud is provided, described further herein.

Specifically, this disclosure discusses a system and a method for managing data access, including: receiving, at a front end presentation layer managed by a server information handling system and from a client information handling system, a read/write request associated with data, the server information handling system in communication with the client information handling system; validating, at a business logic layer of the server information handling system, the read/write request; identifying, by the business logic layer and from a database layer of the server information handling system, a location of data associated with the read/write request that is stored at a data store, the location of the data store distinct from a location of the server information handling system; identifying, by the business logic layer and from the database layer, encryption keys associated with the data; requesting, by the business logic layer and from the data store, the data based on i) the location of the data store storing the data, and ii) the encryption keys associated with the data; and providing, by the data store and to the client information handling system, a response to the read/write request, the response including the data.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of the information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
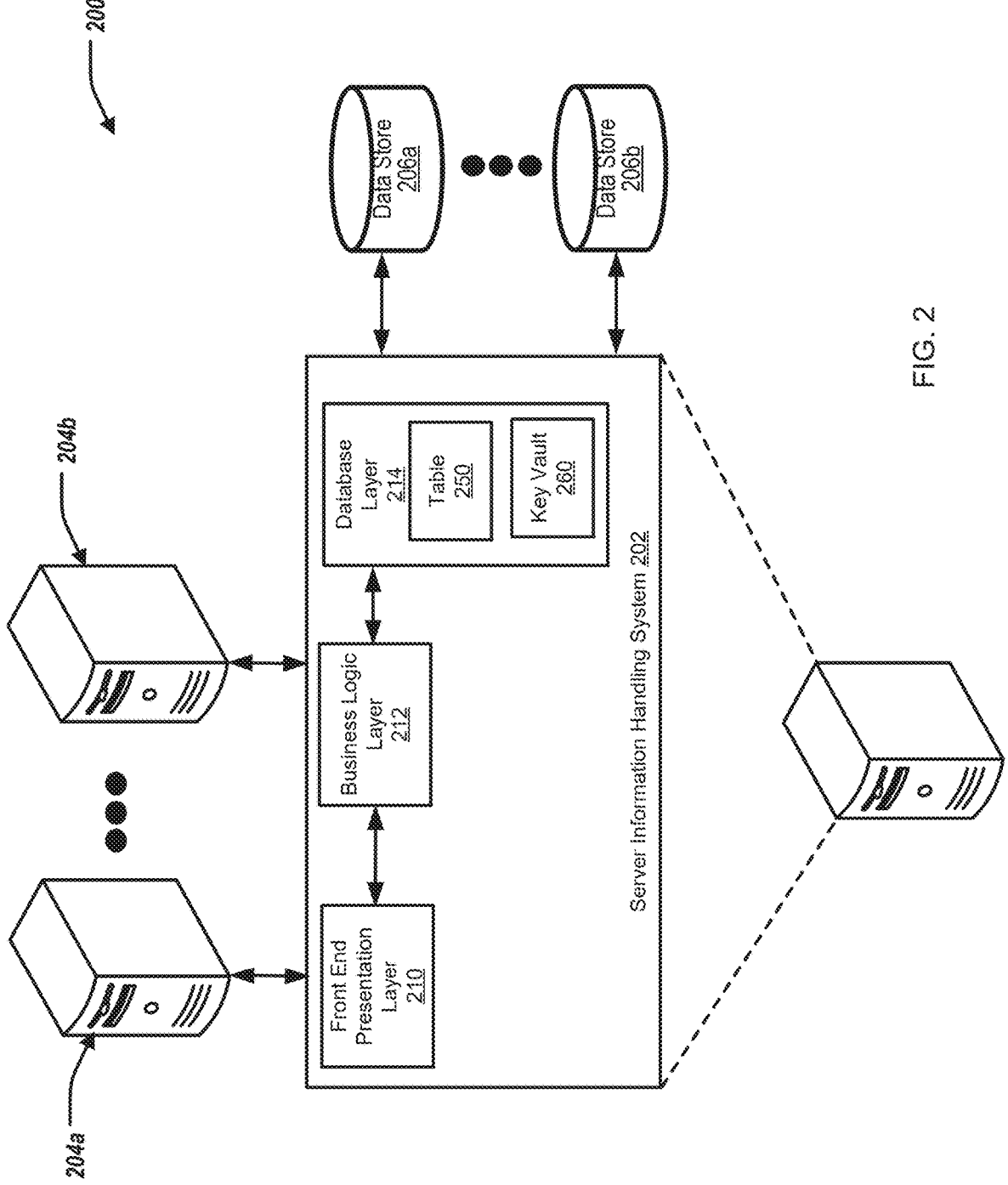
FIG. 2 illustrates a block diagram of a computing environment for managing data access via hybrid cloud and multi-cloud data stores.

Turning to FIG. 2, FIG. 2 illustrates an environment 200 including a server information handling system 202, client information handling systems 204a, 204b (collectively referred to as client information handling systems 204), and data stores 206a, 206b (collectively referred to as data stores 206). The environment 200 can include any number of client information handling systems 204 and any number of data stores 206.

The server information handling system 202 can include a front end presentation layer 210 (or front end presentation computing module 210), a business logic layer 212 (a business logic computing module 212), and a data layer 214 (or a data computing module 214). In some examples, the server information handling system 202 is similar to, or includes, the information handling system 100 of FIG. 1. In some examples, the client information handling system 204 is similar to, or includes, the information handling system 100 of FIG. 1.

The front end presentation layer 210, in short, can provide and manage an user interface of a website or web application (design, layout); render HTML, CSS, and JavaScript code for the server information handling system 202, handle user interactions, display content, and provide communication with the business logic layer 212 for data retrieval and updates. The business logic layer 212, in short, can process user requests, generate responses to the requests, interact with the data layer 214, APIs, and services thereof, retrieve and manipulate data of the data layer 214, and manage user authentication and session management. The data layer 214 provides access to data.

The front end presentation layer 210 can be in communication with the business logic layer 212. The business logic layer 212 can be in communication with the front end presentation layer 210 and the data layer 214. The data layer 214 can be in communication with the business logic layer 212.

The client information handling systems 204 can be in communication with the server information handling system 202. The server information handling system 202 can be in communication with the client information handling systems 204 and the data stores 206.

In some examples, a location of the data store 206a is a separate cloud data store that is distinct from a cloud infrastructure of the server information handling system 202. That is, the location of the data store 206a is physically separate and different than a cloud infrastructure of the server information handling system 202. In some examples, a location of the data store 206b can be included by a cloud infrastructure of the client information handling system 204*b*. That is, the location of the data store 204*b* is physically located at the cloud infrastructure of the client information handling system 204*b* (e.g., on-premise or on-site). Any of the data stores 206 can be similar to the data store 206*a* or the data store 206*b*.

In short, the environment 200 can provide a hybrid cloud multi-tenant architecture endpoint management solution with database management on-premise and management servers in a hosted public cloud. The environment 200 can further provide a multi-cloud multi-tenant architecture endpoint management solution with database management on-premise and management servers in a hosted public cloud, described further herein.

Figure 3:
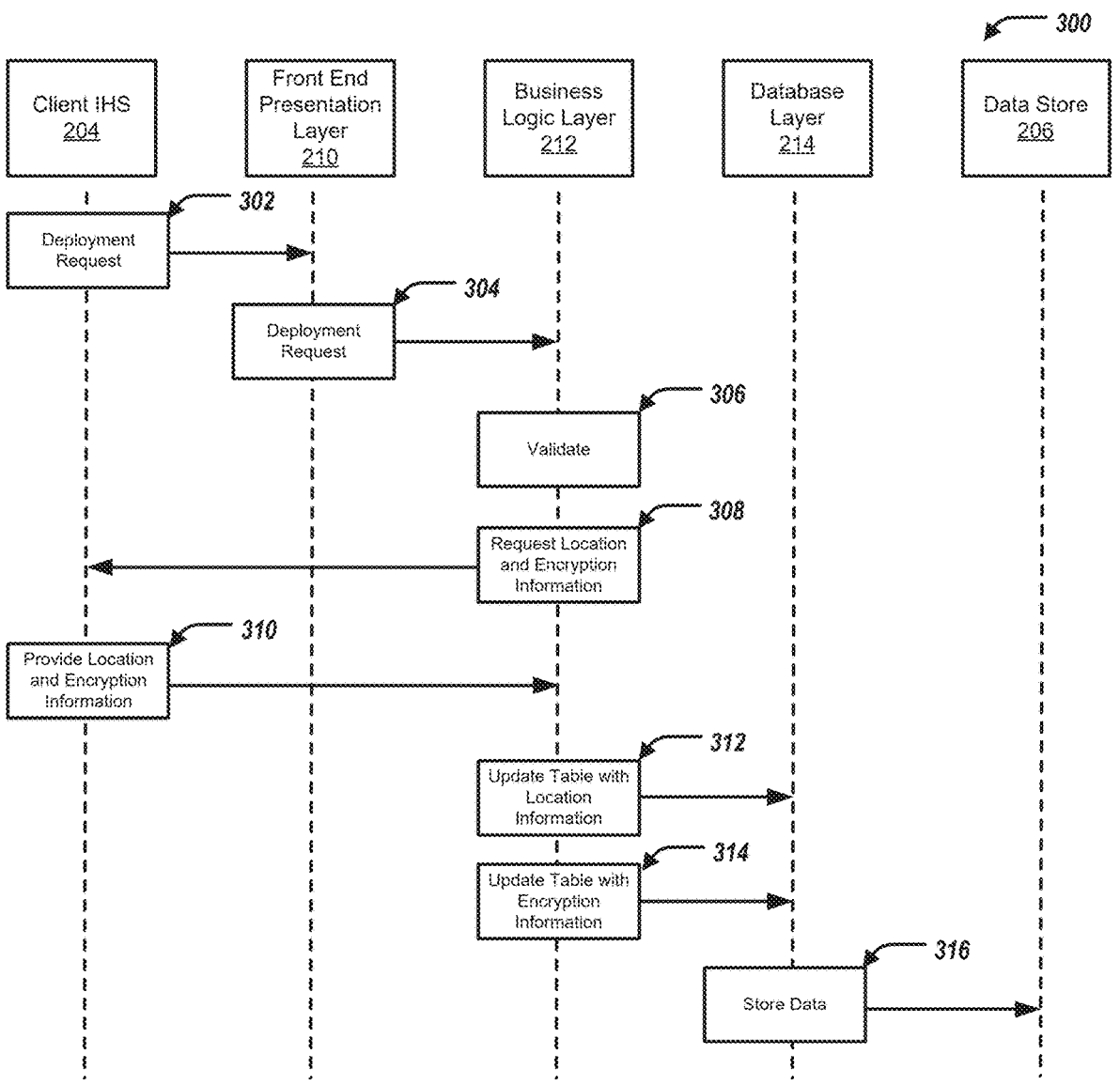
FIG. 3 illustrates a swim-lane diagram for initializing data access via hybrid cloud and multi-cloud data stores.

FIG. 3 illustrates a swim-lane diagram depicting selected elements of an embodiment of a method 300 for initializing data access via hybrid cloud and multi-cloud data stores. The method 300 may be performed by the information handling system 100, the server information handling system 202, the client information handling systems 204, and/or the data stores 206, and with reference to FIGS. 1-2. It is noted that certain operations described in method 300 may be optional or may be rearranged in different embodiments.

The client information handling system 204 provides a deployment request of data, at 302. The deployment request of data can include an initial setup request for storage of data. The front end presentation layer 210 can receive the deployment request, and forward the deployment request to the business logic layer 212, at 304. The business logic layer 212 can validate the deployment request, at 306. Specifically, the business logic layer 212 can validate the deployment request, credentials of a user associated with the client information handling system 204, the data of the request, and the like.

The business logic layer 212 can request input indicating the location of storage of the data, and encryption keys for the data, at 308. That is, the business logic layer 212 can request such input from the client information handling system 204 to setup and/or initialize the appropriate data store 206. The client information handling system 204 can provide the input indicating the location of storage of the data, and encryption keys for the data to the business logic layer 212, at 310. For example, the location of the storage of the data can indicate the data store 206. In some examples, a location of the data store 206 can be a separate cloud data store that is distinct from a cloud infrastructure of the server information handling system 202. That is, the location of the data store 206 is physically separate and different than a cloud infrastructure of the server information handling system 202. In some examples, a location of the data store 206 can be included by a cloud infrastructure of the client information handling system 204. That is, the location of the data store 206 is physically located at the cloud infrastructure of the client information handling system 204 (e.g., on-premise or on-site).

The business logic layer 212 can update a table 250 at the database layer 214, at 312. Specifically, the business logic layer 212 updates the table 250 at the database layer 214 to indicate the location of storage of the data. For example, the indication of the location of storage of the data can indicate data store 206*a* or data store 206*b*. The indication of the location of the storage of the data can indicate data store 206*a* when the user input indicates to store the data at a data store that is physically separate and different than a cloud infrastructure of the server information handling system 202. The indication of the location of the storage of the data can indicate data store 206*b* when the user input indicates to store the data at a data store that is physically located at the cloud infrastructure of the client information handling system 204.

The business logic layer 212 can update a key vault 260 at the database layer 214, at 314. Specifically, the business logic layer 212 updates the key vault 260 at the database layer 214 to store the encryption keys that are associated with the data. The encryption keys can be implemented to encrypt/decrypt and access the data, and/or encrypt/decrypt and access the appropriate data store 206. In some examples, the encryption keys are Unique Talent Specific Encryption Keys.

The database layer 214 stores the data at the data store 206, at 316. Specifically, the database layer 214 stores the data at the data store 206 that is indicated by the location of the user input and the table 250. For example, when the user input/data table 250 indicates to store the data at a data store that is physically separate and different than a cloud infrastructure of the server information handling system 202, the database layer 214 stores the data at the data store 206*a*. For example, when the user input/data table 250 indicates to store the data at a data store that is physically located at the cloud infrastructure of the client information handling system, the database layer 214 stores the data at the data store 206*b*.

Figure 4:
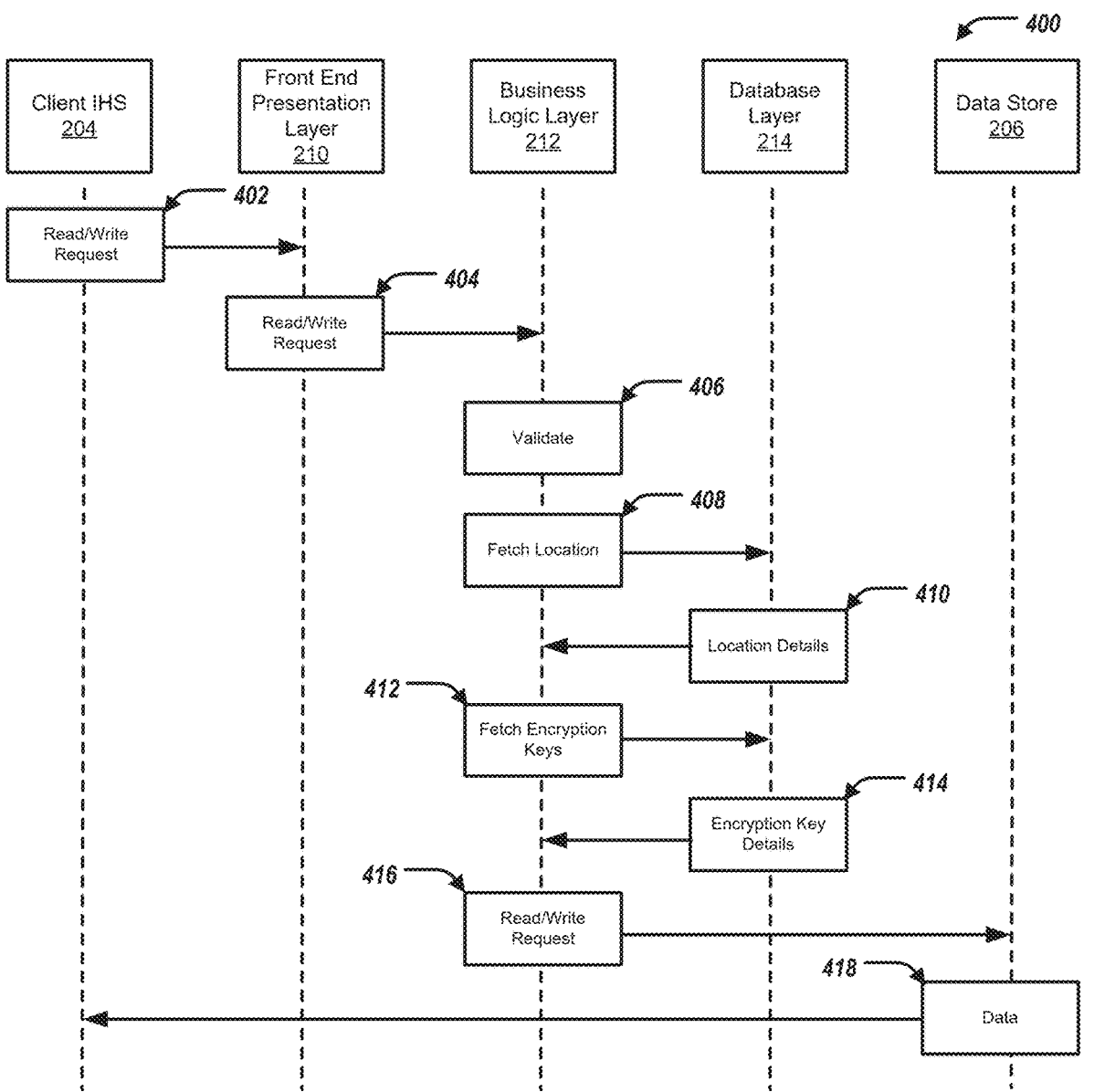
FIG. 4 illustrates a swim-lane diagram for managing data access via hybrid cloud and multi-cloud data stores.

FIG. 4 illustrates a swim-lane diagram depicting selected elements of an embodiment of a method 300 for managing data access via hybrid cloud and multi-cloud data stores. The method 400 may be performed by the information handling system 100, the server information handling system 202, the client information handling systems 204, and/or the data stores 206, and with reference to FIGS. 1-2. It is noted that certain operations described in method 400 may be optional or may be rearranged in different embodiments.

The client information handling system 204*a* provides a read/write request associated with data, at 402. The front end presentation layer 210 can receive the read/write request, and forward the read/write request to the business logic layer 212, at 404. The business logic layer 212 can validate the read/write request, at 406. Specifically, the business logic layer 212 can validate the read/write request, credentials of a user associated with the client information handling system 204*b*, the data associated with the read/write request, and the like.

The business logic layer 212 can fetch a location of the data of the read/write request, at 408. The database layer 214 returns the location of the data of the read/write request to the business logic layer 212, at 410. That is, the data can be associated with a particular location—data store 206*a* or data store 206*b*. The business logic layer 212 can fetch the location of the data of the read/write request from the database layer 214, and in particular, the table 250 of the database layer 214. That is, the table 250 can indicate the location of the data of the read/write request. The business logic layer 212 accesses the table 250 to identify the location of the data associated with the read/write request that is stored by the data store 206. For example, the data of the read/write request can be stored by the data store 206*a* (a separate cloud data store that is distinct from a cloud infrastructure of the server information handling system 202).

The business logic layer 212 can fetch the encryption keys for the data of the read/write request, at 412. The database layer 214 returns the encryption keys for the data of the read/write request to the business logic layer 212, at 414.

The business logic layer 212 accesses the key vault 260 to fetch the encryption keys for the data associated with the read/write request.

The business logic layer 212 can request the data from the data store 206a, at 416. Specifically, the business logic layer 212 can request the data from the data store 206a based on i) the location of the data store 206 storing the data and ii) the encryption keys associated with the data. That is, as the data of the read/write request is associated with the data store 206a (a separate cloud data store that is distinct from a cloud infrastructure of the server information handling system 202), the business logic layer 212 requests the data from the data store 206a utilizing the encryption key.

The data store 206a provides, to the client information handling system 204a, a response to the read/write request, at 418. Specifically, the data store 206a provides, to the client information handling system 204a, a response to the read/write request that includes the data.

In a further implementation, the client information handling system 204b provides an additional read/write request associated with additional data, at 402. The front end presentation layer 210 can receive the additional read/write request, and forward the additional read/write request to the business logic layer 212, at 404. The business logic layer 212 can validate the additional read/write request, at 406. Specifically, the business logic layer 212 can validate the additional read/write request, credentials of a user associated with the client information handling system 204b, the additional data associated with the additional request, and the like.

The business logic layer 212 can fetch a location of the additional data of the additional read/write request, at 408. The database layer 214 returns the location of the additional data of the additional read/write request to the business logic layer 212, at 410. That is, the additional data can be associated with a particular location—data store 206a or data store 206b. The business logic layer 212 can fetch the location of the additional data of the additional read/write request from the database layer 214, and in particular, the table 250 of the database layer 214. That is, the table 250 can indicate the location of the additional data of the additional read/write request. The business logic layer 212 accesses the table 250 to identify the location of the additional data associated with the additional read/write request that is stored by the data store 206. For example, the additional data of the additional read/write request can be stored by the data store 206b (physically located at the cloud infrastructure of the client information handling system 204b).

The business logic layer 212 can fetch the encryption keys for the additional data of the additional read/write request, at 412. The database layer 214 returns the additional encryption keys for the additional data of the additional read/write request to the business logic layer 212, at 414. The business logic layer 212 accesses the key vault 260 to fetch the additional encryption keys for the data associated with the additional read/write request.

The business logic layer 212 can request the additional data from the data store 206b, at 416. Specifically, the business logic layer 212 can request the additional data from the data store 206b based on i) the location of the data store 206 storing the additional data and ii) the additional encryption keys associated with the additional data. That is, as the additional data of the additional read/write request is associated with the data store 206b (physically located at the cloud infrastructure of the client information handling system 204b), the business logic layer 212 requests the additional data from the additional data store 206b utilizing the additional encryption keys.

The data store 206b provides, to the client information handling system 204b, a response to the additional read/write request, at 418. Specifically, the data store 206b provides, to the additional client information handling system 204a, a response to the additional read/write request that includes the additional data.

Figure 5:
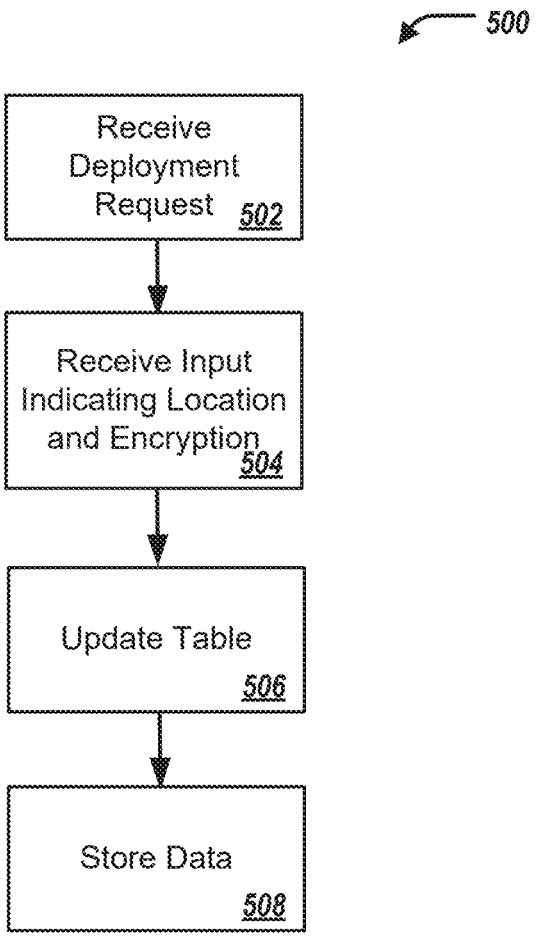
FIG. 5 illustrates a method for initializing data access via hybrid cloud and multi-cloud data stores.

FIG. 5 illustrates a flowchart depicting selected elements of an embodiment of a method 500 for initializing data access via hybrid cloud and multi-cloud data stores. The method 500 may be performed by the information handling system 100, the server information handling system 202, the client information handling systems 204, and/or the data stores 206, and with reference to FIGS. 1-2. It is noted that certain operations described in method 500 may be optional or may be rearranged in different embodiments.

The client information handling system 204 provides a deployment request of data, at 502. The business logic layer 212 can receive input indicating the location of storage of the data, and encryption keys for the data, at 504. The business logic layer 212 can update the table 250 and the key vault 260 at the database layer 214, at 506. The database layer 214 stores the data at the data store 206, at 508.

Figure 6:
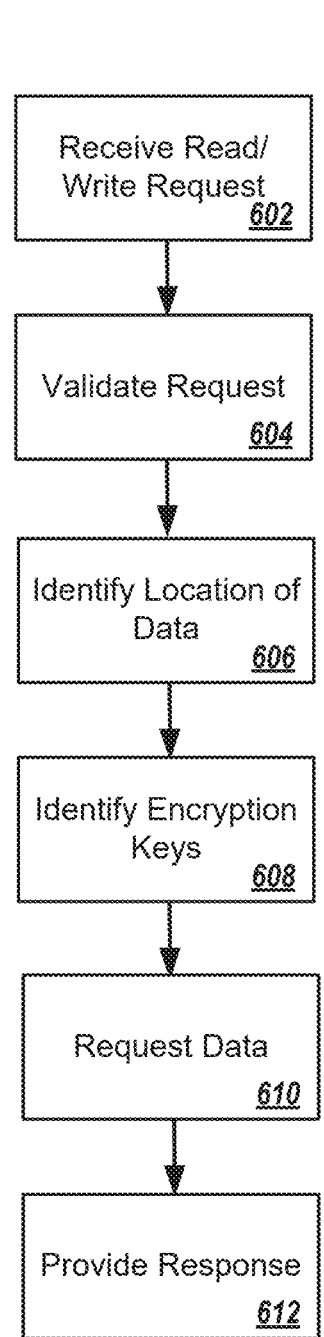
FIG. 6 illustrates a method for managing data access via hybrid cloud and multi-cloud data stores.

FIG. 6 illustrates a flowchart depicting selected elements of an embodiment of a method 600 for managing data access via hybrid cloud and multi-cloud data stores. The method 600 may be performed by the information handling system 100, the server information handling system 202, the client information handling systems 204, and/or the data stores 206, and with reference to FIGS. 1-2. It is noted that certain operations described in method 600 may be optional or may be rearranged in different embodiments.

The client information handling system 204 provides a read/write request associated with data, at 602. The business logic layer 212 can validate the read/write request, at 604. The business logic layer 212 can identify a location of the data of the read/write request, at 606. The business logic layer 212 can identify the encryption keys for the data of the read/write request, at 608. The business logic layer 212 can request the data from the data store 206, at 610. The data store 206 provides, to the client information handling system 204, a response to the read/write request, at 612.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of managing data access, including:

receiving, at a front end presentation layer of a server information handling system and from a client information handling system, a deployment request for data;

receiving, at the front end presentation layer of the server information handling system and from the client information handling system, input indicating the location of storage of the data and encryption keys;

updating, by a business logic layer of the server information handling system, a table at the database layer indicating i) the location of storage of the data and ii) the encryption keys;

storing, by the database layer of the server information handling system, the data at the data store that is indicated by the location of the user input;

receiving, at the front end presentation layer managed by the server information handling system and from the client information handling system, a read/write request associated with the data, the server information handling system in communication with the client information handling system;

validating, at the business logic layer of the server information handling system, the read/write request;

identifying, by the business logic layer and from a database layer of the server information handling system, a location of data associated with the read/write request that is stored at a data store, the location of the data store distinct from a location of the server information handling system;

identifying, by the business logic layer and from the database layer, encryption keys associated with the data;

requesting, by the business logic layer and from the data store, the data based on i) the location of the data store storing the data, and ii) the encryption keys associated with the data; and providing, by the data store and to the client information handling system, a response to the read/write request, the response including the data.

2. The computer-implemented method of claim 1, wherein the location of the data store is a separate cloud data store distinct from a cloud infrastructure of the server information handling system.

3. The computer-implemented method of claim 1, wherein the location of the data store is included by a cloud infrastructure of the client information handling system.

4. The computer-implemented method of claim 1, further including:

receiving, at the front end presentation layer managed by the server information handling system and from an additional client information handling system, an additional read/write request associated with additional data, the server information handling system in communication with the additional client information handling system;

validating, at the business logic layer management by the server information handling system, the additional read/write request;

identifying, by the business logic layer and from the database layer of the server information handling system, a location of the additional data associated with the additional read/write request that is stored at an additional data store, the location of the additional data store distinct from the location of the server information handling system and distinct from the location of the data store;

identifying, by the business logic layer and from the database layer, additional encryption keys associated with the additional data;

requesting, by the business logic layer and from the additional data store, the additional data based on i) the location of the additional data store storing the additional data, and ii) the additional encryption keys associated with the additional data; and providing, by the additional data store and to the additional client information handling system, an additional response to the additional read/write request, the additional response including the additional data.

5. An information handling system comprising a processor having access to memory media storing instructions executable by the processor to perform operations, comprising:

receiving, at a front end presentation layer of a server information handling system and from a client information handling system, a deployment request for data;

receiving, at the front end presentation layer of the server information handling system and from the client information handling system, input indicating the location of storage of the data and encryption keys;

updating, by a business logic layer of the server information handling system, a table at the database layer indicating i) the location of storage of the data and ii) the encryption keys;

storing, by the database layer of the server information handling system, the data at the data store that is indicated by the location of the user input;

receiving, at the front end presentation layer managed by the server information handling system and from the client information handling system, a read/write request associated with the data, the server information handling system in communication with the client information handling system;

validating, at the business logic layer of the server information handling system, the read/write request;

identifying, by the business logic layer and from a database layer of the server information handling system, a location of data associated with the read/write request that is stored at a data store, the location of the data store distinct from a location of the server information handling system;

identifying, by the business logic layer and from the database layer, encryption keys associated with the data;

requesting, by the business logic layer and from the data store, the data based on i) the location of the data store storing the data, and ii) the encryption keys associated with the data; and providing, by the data store and to the client information handling system, a response to the read/write request, the response including the data.

6. The information handling system of claim 5, wherein the location of the data store is a separate cloud data store distinct from a cloud infrastructure of the server information handling system.

7. The information handling system of claim 5, wherein the location of the data store is included by a cloud infrastructure of the client information handling system.

8. The information handling system of claim 5, the operations further including:

receiving, at the front end presentation layer managed by the server information handling system and from an additional client information handling system, an additional read/write request associated with additional data, the server information handling system in communication with the additional client information handling system;

validating, at the business logic layer management by the server information handling system, the additional read/write request;

identifying, by the business logic layer and from the database layer of the server information handling system, a location of the additional data associated with the additional read/write request that is stored at an additional data store, the location of the additional data store distinct from the location of the server information handling system and distinct from the location of the data store;

identifying, by the business logic layer and from the database layer, additional encryption keys associated with the additional data;

requesting, by the business logic layer and from the additional data store, the additional data based on i) the location of the additional data store storing the additional data, and ii) the additional encryption keys associated with the additional data; and providing, by the additional data store and to the additional client information handling system, an additional response to the additional read/write request, the additional response including the additional data.

9. A non-transitory computer-readable medium storing software comprising instructions executable by one or more computers which, upon such execution, cause the one or more computers to perform operations comprising:

receiving, at a front end presentation layer of a server information handling system and from a client information handling system, a deployment request for data;

receiving, at the front end presentation layer of the server information handling system and from the client information handling system, input indicating the location of storage of the data and encryption keys;

updating, by a business logic layer of the server information handling system, a table at the database layer indicating i) the location of storage of the data and ii) the encryption keys;

storing, by the database layer of the server information handling system, the data at the data store that is indicated by the location of the user input;

receiving, at the front end presentation layer managed by the server information handling system and from the client information handling system, a read/write request associated with the data, the server information handling system in communication with the client information handling system;

validating, at the business logic layer of the server information handling system, the read/write request;

identifying, by the business logic layer and from a database layer of the server information handling system, a location of data associated with the read/write request that is stored at a data store, the location of the data store distinct from a location of the server information handling system;

identifying, by the business logic layer and from the database layer, encryption keys associated with the data;

requesting, by the business logic layer and from the data store, the data based on i) the location of the data store storing the data, and ii) the encryption keys associated with the data; and providing, by the data store and to the client information handling system, a response to the read/write request, the response including the data.

10. The non-transitory computer-readable medium of claim 9, wherein the location of the data store is a separate cloud data store distinct from a cloud infrastructure of the server information handling system.

11. The non-transitory computer-readable medium of claim 9, wherein the location of the data store is included by a cloud infrastructure of the client information handling system.

12. The non-transitory computer-readable medium of claim 9, the operations further including:

receiving, at the front end presentation layer managed by the server information handling system and from an additional client information handling system, an additional read/write request associated with additional data, the server information handling system in communication with the additional client information handling system;

validating, at the business logic layer management by the server information handling system, the additional read/write request;

identifying, by the business logic layer and from the database layer of the server information handling system, a location of the additional data associated with the additional read/write request that is stored at an additional data store, the location of the additional data store distinct from the location of the server information handling system and distinct from the location of the data store;

identifying, by the business logic layer and from the database layer, additional encryption keys associated with the additional data;

requesting, by the business logic layer and from the additional data store, the additional data based on i) the location of the additional data store storing the additional data, and ii) the additional encryption keys associated with the additional data; and providing, by the additional data store and to the additional client information handling system, an additional response to the additional read/write request, the additional response including the additional data.

* * * * *